US012680498B2

(12) United States Patent
Ivakitch

(10) Patent No.: US 12,680,498 B2
(45) Date of Patent: Jul. 14, 2026

(54) BLEED-OFF ASSEMBLY INTAKE DEVICE FOR AN AIRCRAFT PROPULSION SYSTEM

(71) Applicant: Pratt & Whitney Canada Corp., Longueuil (CA)

(72) Inventor: Richard Ivakitch, Scarborough (CA)

(73) Assignee: Pratt & Whitney Canada Corp., Longueuil (CA)

( * ) Notice: Subject to any disclaimer, the term of this patent is extended or adjusted under 35 U.S.C. 154(b) by 0 days.

(21) Appl. No.: 18/436,326

(22) Filed: Feb. 8, 2024

(65) Prior Publication Data

US 2025/0257689 A1      Aug. 14, 2025

(51) Int. Cl.
| | |
|---|---|
| *F02C 7/00* | (2006.01) |
| *F02C 7/052* | (2006.01) |
| *F02C 9/18* | (2006.01) |

(52) U.S. Cl.
CPC ............... *F02C 7/052* (2013.01); *F02C 9/18* (2013.01)

(58) Field of Classification Search
None
See application file for complete search history.

(56) References Cited

U.S. PATENT DOCUMENTS

| | | | | |
|---|---|---|---|---|
| 4,617,028 A | * | 10/1986 | Ray | F02C 7/05 55/306 |
| 5,211,003 A | * | 5/1993 | Samuel | F02C 6/08 60/751 |

| | | | | |
|---|---|---|---|---|
| 11,585,269 B1 | | 2/2023 | Girard | |
| 11,639,689 B2 | | 5/2023 | Dobson | |
| 11,731,778 B1 | | 8/2023 | Girard | |
| 11,821,363 B1 | | 11/2023 | Girard | |
| 2005/0123394 A1 | * | 6/2005 | McArdle | F04D 25/04 415/164 |
| 2005/0123397 A1 | * | 6/2005 | McArdle | F01D 17/165 415/196 |
| 2007/0017208 A1 | * | 1/2007 | Ralls, Jr. | F02C 7/08 60/39.511 |
| 2008/0152500 A1 | * | 6/2008 | Mehring | F04D 29/701 416/181 |

(Continued)

OTHER PUBLICATIONS

EP Search Report for EP Patent Application No. 25156701.2 dated Jul. 11, 2025.

*Primary Examiner* — Edwin Kang
(74) *Attorney, Agent, or Firm* — Getz Balich LLC

(57)      ABSTRACT

An aircraft propulsion system includes a casing, a compressor, and an assembly. The casing forms an annular cavity. The compressor is configured to direct a compressed air flow into and through the annular cavity in an air flow direction. The assembly includes an intake device disposed on the casing. The intake device includes a particle separator body and an air conduit. The particle separator body extends from an upstream end to a downstream end in the air flow direction. The particle separator body forms an interior surface and an exterior surface. The interior surface forms an inlet cavity of the intake device. The inlet cavity has an inlet opening at the downstream end. The exterior surface forms an airfoil of the particle separator body. The air conduit extends through the casing. The air conduit includes a conduit inlet within the particle separator body. The conduit inlet is disposed at the inlet cavity.

20 Claims, 8 Drawing Sheets

(56) References Cited

U.S. PATENT DOCUMENTS

| | | | | |
|---|---|---|---|---|
| 2014/0331678 | A1* | 11/2014 | Cramer | F23R 3/28 |
| | | | | 60/751 |
| 2015/0377074 | A1* | 12/2015 | de Diego | F23R 3/02 |
| | | | | 60/39.092 |
| 2016/0017755 | A1* | 1/2016 | Low | F01D 25/24 |
| | | | | 60/805 |
| 2016/0169049 | A1* | 6/2016 | Eastwood | F01D 25/28 |
| | | | | 415/213.1 |
| 2018/0080389 | A1* | 3/2018 | Schwarz | F02C 7/185 |
| 2018/0135516 | A1* | 5/2018 | Nasir | F02C 7/00 |
| 2018/0340549 | A1* | 11/2018 | Hall | F04D 29/464 |
| 2019/0170353 | A1* | 6/2019 | Aoyama | F01D 9/02 |
| 2020/0166211 | A1* | 5/2020 | Dudebout | F23R 3/06 |
| 2021/0070423 | A1* | 3/2021 | Weaver | F16B 39/101 |
| 2021/0172455 | A1* | 6/2021 | Kisun | F04D 17/10 |
| 2021/0239013 | A1* | 8/2021 | Simard-Bergeron | |
| | | | | F16H 57/0479 |
| 2023/0029960 | A1* | 2/2023 | Dobson | F02C 9/18 |
| 2023/0358171 | A1 | 11/2023 | Girard | |

* cited by examiner

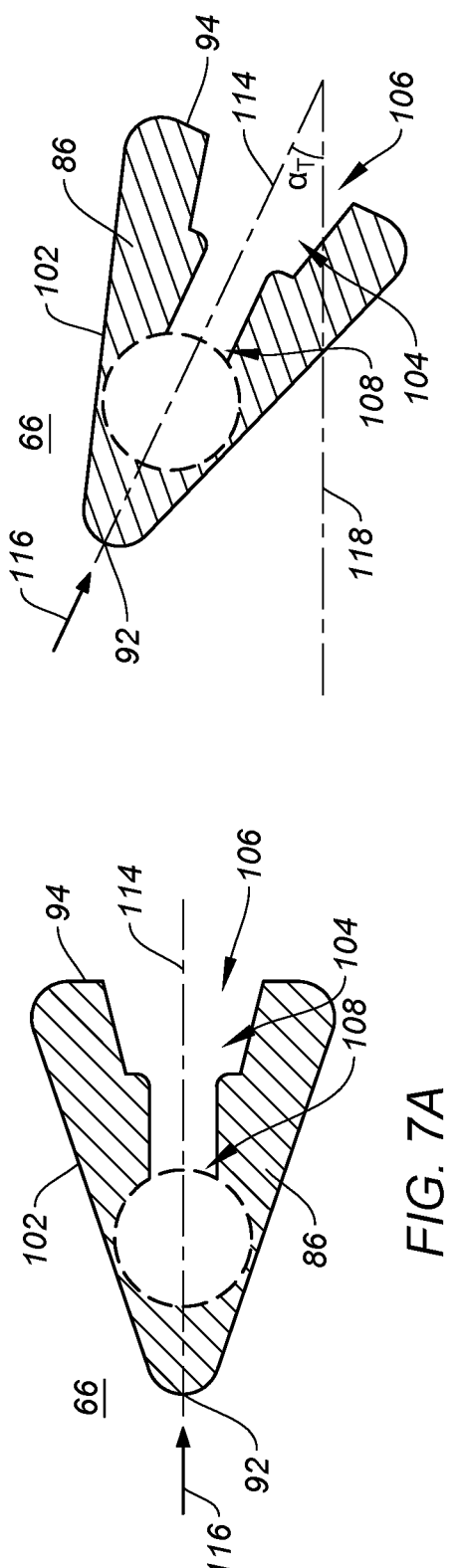
FIG. 7A
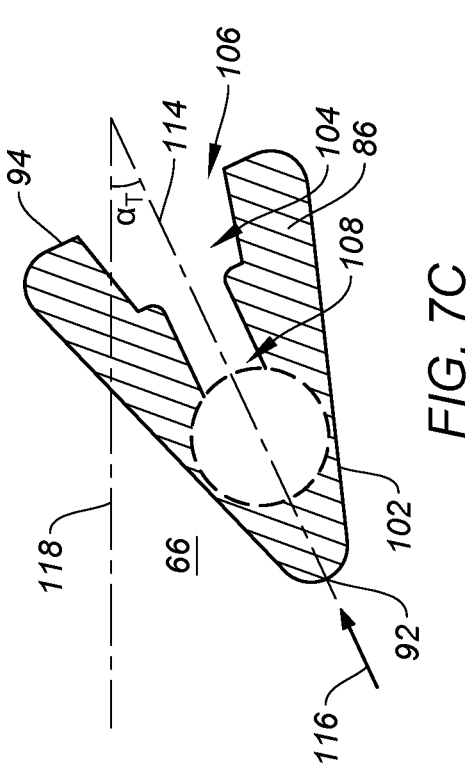
FIG. 7B
FIG. 7C

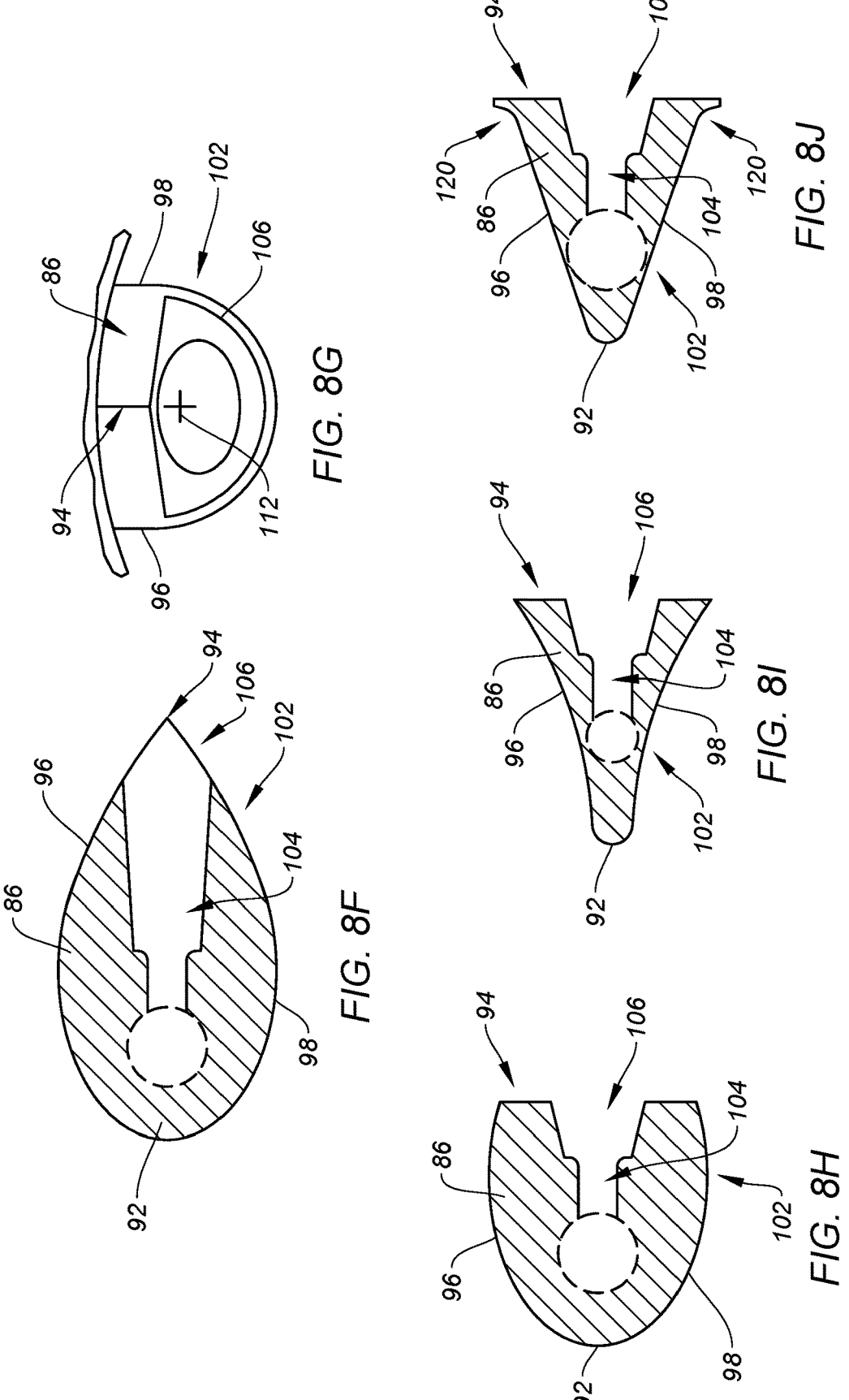

BLEED-OFF ASSEMBLY INTAKE DEVICE FOR AN AIRCRAFT PROPULSION SYSTEM

TECHNICAL FIELD

This disclosure relates to a bleed-off assembly for an aircraft propulsion system.

BACKGROUND OF THE ART

Aircraft propulsion systems may frequently include an engine (e.g., a gas turbine engine, an intermittent combustion engine, etc.) or turbomachinery (e.g., a turbocompressor) may use compressed air for operation of one or more systems of the aircraft propulsion system. Depending on the source of the compressed air, some amount of contaminants may be present and may be entrained with or otherwise carried by the compressed air. Some air systems which use this compressed air may be particularly sensitive to the presence of contaminants, such as particulate matter, within the compressed air. Various systems and methods are known in the art for reducing the impact of particulate matter on air systems for aircraft propulsion systems. While these known systems and methods may be suitable for their intended purposes, there is always room in the art for improvement.

SUMMARY

It should be understood that any or all of the features or embodiments described herein can be used or combined in any combination with each and every other feature or embodiment described herein unless expressly noted otherwise.

According to an aspect of the present disclosure, an aircraft propulsion system includes a casing, a compressor, and an assembly. The casing extends circumferentially about an axis of the aircraft propulsion system. The casing includes an inner radial side. The inner radial side forms and circumscribes an annular cavity. The compressor is disposed about the axis. The compressor is configured to direct a compressed air flow into and through the annular cavity in an air flow direction. The assembly includes an intake device disposed on the casing. The intake device includes a particle separator body and an air conduit. The particle separator body is disposed at the inner radial side. The particle separator body extends from an upstream end to a downstream end in the air flow direction. The particle separator body extends between and to a first lateral side and a second lateral side. The first lateral side and the second lateral side are disposed at the inner radial side. The particle separator body forms an interior surface and an exterior surface. The interior surface forms an inlet cavity of the intake device. The inlet cavity has an inlet opening at the downstream end. The exterior surface forms an airfoil of the particle separator body. The airfoil has a leading edge at the upstream end. The air conduit extends through the casing. The air conduit includes a conduit inlet within the particle separator body. The conduit inlet is disposed at the inlet cavity.

In any of the aspects or embodiments described above and herein, the particle separator body may have a centerline extending between and to the upstream end and the downstream end. The centerline may be oriented substantially parallel to the axis.

In any of the aspects or embodiments described above and herein, the particle separator body may have a centerline extending between and to the upstream end and the downstream end. The centerline may be oriented at a tangent angle relative to an axial direction of the axis.

In any of the aspects or embodiments described above and herein, the airfoil formed by the exterior surface may increase in circumferential width, relative to the axis, from the upstream end to the downstream end along the casing.

In any of the aspects or embodiments described above and herein, the conduit inlet may be disposed within the particle separator body closer to the upstream end than the downstream end.

In any of the aspects or embodiments described above and herein, the conduit inlet may extend about an inlet axis. The inlet axis may be perpendicular to the axis.

In any of the aspects or embodiments described above and herein, the inlet cavity may extend between and to the inlet opening and an outlet opening at the conduit inlet. The inlet opening may have a greater cross-sectional area than the outlet opening.

In any of the aspects or embodiments described above and herein, the inlet cavity may have an oblong cross-sectional shape.

In any of the aspects or embodiments described above and herein, the assembly may further include a bleed-off valve and a pneumatic actuator. The pneumatic actuator may be operably connected to the bleed-off valve to position the bleed-off valve in an open position, a closed position, or an intermediate position between the open position and the closed position.

The pneumatic actuator may be connected in fluid communication with the air conduit to receive a portion of the compressed air flow from the inlet cavity for positioning the bleed-off valve.

In any of the aspects or embodiments described above and herein, the assembly may further include a pilot valve connected in fluid communication with and between the air conduit and the pneumatic actuator.

In any of the aspects or embodiments described above and herein, the bleed-off valve may include a bleed inlet and a bleed outlet. The bleed inlet may be connected in fluid communication with the compressor by a pressure relief line. The bleed-off valve may be positionable in the open position, the closed position, or the intermediate position to direct a bleed air flow from the compressor to the outlet.

In any of the aspects or embodiments described above and herein, the aircraft propulsion system may further include a diffuser connected in fluid communication with and between the compressor and the annular cavity. The diffuser may be configured to direct the compressed air flow from the compressor to the annular cavity.

In any of the aspects or embodiments described above and herein, the particle separator body may have an arcuate shape between the first lateral side and the second lateral side. The arcuate shape of the particle separator body may form the inlet cavity between the particle separator body and the inner radial side.

According to another aspect of the present disclosure, a bleed-off assembly for an aircraft propulsion system includes a casing, a bleed-off valve and a pneumatic actuator, and an intake device. The casing extends circumferentially about an axis. The casing includes an inner radial side. The inner radial side forms and circumscribes an annular cavity. The bleed-off valve and the pneumatic actuator are disposed radially outside of the casing. The pneumatic actuator is operably connected to the bleed-off valve to position the bleed-off valve in an open position, a closed position, or an intermediate position between the open position and the closed position. The intake device is disposed on the casing. The intake device includes a particle separator body and an air conduit. The particle separator body is disposed at the inner radial side. The particle separator body extends from an upstream end to a downstream end. The particle separator body extends between and to a first lateral side and a second lateral side. The particle separator body forms an interior surface and an exterior surface. The interior surface forms an inlet cavity of the intake device. The inlet cavity has an inlet opening at the downstream end. The exterior surface forms an airfoil of the particle separator body having a leading edge at the upstream end. The air conduit extends through the casing. The air conduit includes a conduit inlet within the particle separator body. The conduit inlet is disposed at the inlet cavity. The air conduit connects the inlet cavity in fluid communication with the pneumatic actuator.

In any of the aspects or embodiments described above and herein, the particle separator body may have a centerline extending between and to the upstream end and the downstream end. The centerline may be oriented substantially parallel to the axis.

In any of the aspects or embodiments described above and herein, the particle separator body may have a centerline extending between and to the upstream end and the downstream end. The centerline may be oriented at a tangent angle relative to an axial direction of the axis.

In any of the aspects or embodiments described above and herein, the airfoil formed by the exterior surface may increase in circumferential width, relative to the axis, from the upstream end to the downstream end along the casing.

According to another aspect of the present disclosure, an aircraft propulsion system includes a casing, a compressor, and an assembly. The casing extends circumferentially about an axis of the aircraft propulsion system. The casing includes an inner radial side. The inner radial side forms and circumscribes an annular cavity. The compressor is disposed about the axis. The compressor is configured to direct a compressed air flow into and through the cavity in an air flow direction. The assembly includes a bleed-off valve, a pneumatic actuator, and an intake device. The pneumatic actuator is operably connected to the bleed-off valve to position the bleed-off valve in an open position, a closed position, or an intermediate position between the open position and the closed position. The bleed-off valve includes a bleed inlet and a bleed outlet. The bleed inlet is connected in fluid communication with the compressor by a pressure relief line. The bleed-off valve is positionable in the open position, the closed position, or the intermediate position to direct a bleed air flow from the compressor to the outlet. The intake device includes a particle separator body and an air conduit. The particle separator body is disposed at the inner radial side. The particle separator body extends from an upstream end to a downstream end in the air flow direction. The particle separator body forms an inlet cavity and an exterior surface. The inlet cavity has an inlet opening at the downstream end. The exterior surface forms an airfoil of the particle separator body having a leading edge at the upstream end. The air conduit extends through the casing. The air conduit includes a conduit inlet within the particle separator body. The conduit inlet is disposed at the inlet cavity. The air conduit is connected in fluid communication with the pneumatic actuator to direct a portion of the compressed air flow from the inlet cavity to the pneumatic actuator for positioning the bleed-off valve.

In any of the aspects or embodiments described above and herein, the particle separator body may have a centerline extending between and to the upstream end and the downstream end. The centerline may be oriented substantially parallel to the air flow direction.

In any of the aspects or embodiments described above and herein, the particle separator body may have a centerline extending between and to the upstream end and the downstream end. The centerline may be oriented at a tangent angle relative to an axial direction of the axis. The centerline may be oriented substantially parallel to the air flow direction.

The present disclosure, and all its aspects, embodiments and advantages associated therewith will become more readily apparent in view of the detailed description provided below, including the accompanying drawings.

DESCRIPTION OF THE DRAWINGS

FIGS. 7A-C illustrate cutaway bottom views of the intake device of FIG. 2 with different orientations relative to an axis of the aircraft propulsion system, in accordance with one or more embodiments of the present disclosure.

FIGS. 8A-J illustrate cutaway views of bleed-off assembly intake devices having different body configurations, in accordance with one or more embodiments of the present disclosure.

DETAILED DESCRIPTION

Figure 1:
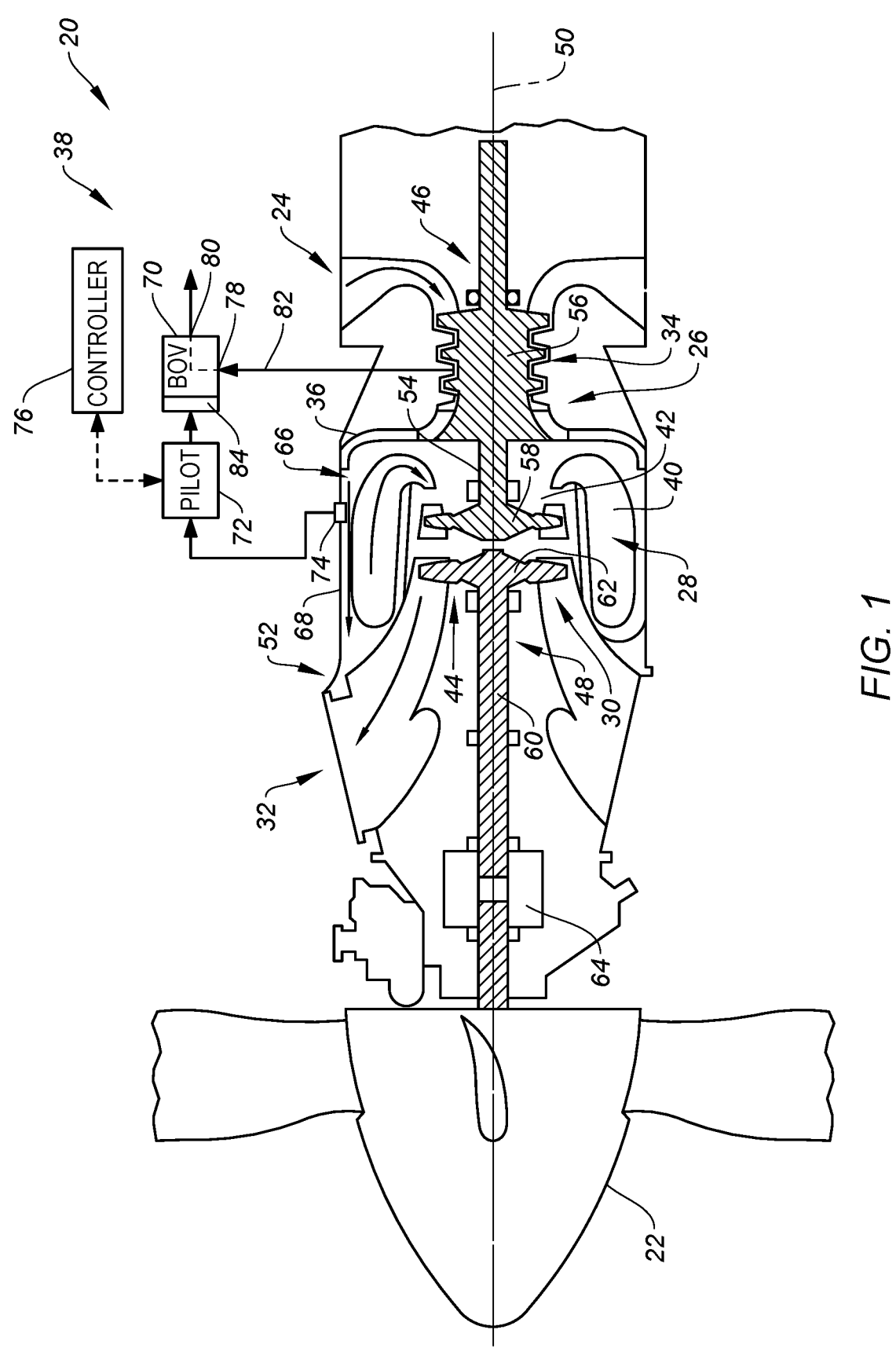
FIG. 1 schematically illustrates a cutaway, side view of a gas turbine engine for an aircraft propulsion system, in accordance with one or more embodiments of the present disclosure.

FIG. 1 schematically illustrates a gas turbine engine 20 for an aircraft propulsion system. The gas turbine engine 20 of FIG. 1 is configured as a multi-spool turboprop engine. However, while the following description and accompanying drawings refer to a turboprop engine as an example, it should be understood that aspects of the present disclosure may be equally applicable to other types of gas turbine engines including, but not limited to, a turboshaft gas turbine engine, a turbofan gas turbine engine, or a turbojet gas turbine engine.

The gas turbine engine 20 of FIG. 1 is configured to drive (e.g., apply a rotational force to) a propulsor 22 (e.g., a propeller) for the aircraft propulsion system. The gas turbine engine 20 of FIG. 1 includes an air inlet 24, a compressor section 26, a combustor section 28, a turbine section 30, an exhaust outlet 32. The compressor section 26 includes a compressor 34, a diffuser 36, and a bleed-off assembly 38. The combustor section 28 includes a combustor 40 (e.g., an annular combustor) forming a combustion chamber. The turbine section 30 includes a first turbine 42 (e.g., a high-pressure turbine) and a second turbine 44 (e.g., a power turbine).

Components of the compressor section 26 and the turbine section 30 form a first rotational assembly 46 (e.g., a high-pressure spool) and a second rotational assembly 48 (e.g., a power spool) of the gas turbine engine 20. The first rotational assembly 46 and the second rotational assembly 48 are mounted for rotation about a rotational axis 50 (e.g., an axial centerline of the gas turbine engine 20) relative to an engine static structure 52 of the gas turbine engine 20. The engine static structure 52 may include one or more engine cases, cowlings, bearing assemblies, and/or other non-rotating structures configured to house and/or support components of the gas turbine engine 20 sections 24, 26, 28, 30, 32.

The first rotational assembly 46 includes a first shaft 54, a bladed compressor rotor 56 for the compressor 34, and a bladed first turbine rotor 58 for the first turbine 42. The first shaft 54 interconnects the bladed compressor rotor 56 and the bladed first turbine rotor 58.

The second rotational assembly 48 includes a second shaft 60 and a bladed second turbine rotor 62 for the second turbine 44. The second shaft 60 is connected to the bladed second turbine rotor 62. The second shaft 60 of FIG. 1 additionally interconnects the bladed second turbine rotor 62 with the propulsor 22. The second shaft 60 of FIG. 1 is operably connected (e.g., coupled) to the propulsor 22 by a reduction gear assembly 64 configured to drive the propulsor 22 at a reduced rotational speed relative to the second shaft 60. The second shaft 60 may alternatively be directly connected to the propulsor 22.

In operation of the gas turbine engine 20 of FIG. 1, ambient air is directed into the gas turbine engine 20 through the air inlet 24 and compressed by the compressor 34. The compressed air is straightened and directed by the diffuser 36 (e.g., a plurality of diffuser pipes, a plurality of diffuser vanes, etc.) into a cavity 66 (e.g., an annular cavity) disposed at (e.g., on, adjacent, or proximate) the combustor 40. The cavity 66 is formed and circumscribed by an outer casing 68 (e.g., a gas generator casing) of the engine static structure 52, which outer casing 68 extends circumferentially about (e.g., completely around) the rotational axis 50 and the cavity 66. The compressed air is directed through the cavity 66, mixed and burned with fuel in the combustor 40, directed through the first turbine 42 and the second turbine 44, and exhausted from the gas turbine engine 20 through the exhaust outlet 32. The bladed first turbine rotor 58 and the bladed second turbine rotor 62 rotationally drive the first rotational assembly 46 and the second rotational assembly 48, respectively, in response to the combustion gas flow through the first turbine 42 and the second turbine 44. The first rotational assembly 46 and the second rotational assembly 48 (e.g., the first shaft 54 and the second shaft 60) are axially separated along the rotational axis 50 (e.g., a "free-turbine" configuration). The present disclosure, however, is not limited to the FIG. 1 configuration of the first rotational assembly 46 and the second rotational assembly 48, and the first rotational assembly 46 and the second rotational assembly 48 may alternatively be concentric relative to the rotational axis 50 or mounted for rotational about discrete rotational axes.

The bleed-off assembly 38 of FIG. 1 includes a bleed-off valve 70, a pilot valve 72, and an intake device 74. The bleed-off valve 70 may additionally include a controller 76.

The bleed-off valve 70 includes an inlet 78 and an outlet 80. The inlet 78 is connected in fluid communication with the compressor section 16. For example, the bleed-off-valve 70 of FIG. 1 is connected in fluid communication with an intermediate stage of the compressor 34 by a pressure relief line 82 at the inlet 78. The bleed-off valve 70 is configured to selectively direct compressed bleed air from the inlet 78 to the outlet 80. The bleed air may be directed out of the aircraft propulsion system (e.g., the gas turbine engine 20) at the outlet 80. Additionally or alternatively, the bleed air from the outlet 80 may be used for operation of one or more bleed air systems (e.g., pneumatic actuation systems, air cooling systems, etc.).

The bleed-off valve 70 may include or otherwise be operably connected to a pneumatic actuator 84. The pneumatic actuator 84 may be operated by compressed air to selectively position the bleed-off valve 70 in a closed position, an open position, or a plurality of intermediate positions between the closed position and the open position, to control bleed air flow through the bleed-off valve 70 from the inlet 78 to the outlet 80.

The bleed-off valve 70 may be a piloted valve. The bleed-off assembly 38 of FIG. 1, for example, includes the pilot valve 72 connected in fluid communication between the intake device 74 and the pneumatic actuator 84. The pilot valve 72 may be connected in fluid communication with the intake device 74 by one or more intermediate components (e.g., a particulate filter, an orifice pack, etc.). The pilot valve 72 is configured to control a flow of compressed air from the intake device 74 to the pneumatic actuator 84 to control the position of the bleed-off valve 70. The pilot valve 72 may be configured, for example, as a solenoid valve. For example, the pilot valve 72 position may be controlled using an electrical signal provided by the controller 76.

The bleed-off assembly 38 is configured to control (e.g., regulate) bleed air flow from the compressor 34 by selectively releasing the bleed air from the compressor 34 (e.g., the intermediate stage of the compressor 34) to the surrounding atmosphere and/or to one or more bleed air systems, based on operating conditions of the gas turbine engine 20. For example, bleed air from the compressor 34 may flow through the pressure relief line 82 and may be released to the surrounding atmosphere by the bleed-off valve 70 (e.g., from the outlet 80). The bleed-off valve 70 may be opened at a relatively low rotational speeds of the first rotational assembly 46 (e.g., a relatively low engine power condition) and may be closed at a relatively high rotational speeds of the first rotational assembly 466 (e.g., a relatively high engine power condition). The controller 76 may be configured to determine whether operating conditions of the gas turbine engine 20 satisfy criteria for releasing compressed air from the compressor 34 via the bleed-off valve 70, for example, based on signals from one or more sensors (e.g., pressure sensors, temperature sensors, etc.) disposed within the compressor section 16.

The compressed air flow through the cavity 66 may have a high velocity as it flows from the diffuser 36 to the combustor 40. This high-velocity compressed air flow may carry entrained particulate matter such as dust, dirt, sand, debris, etc. The particulate matter may have a size within a range of approximately 50 to 200 microns; however, particulate matter size may vary. The bleed-off valve 70 and/or the pneumatic actuator 84 may exhibit some sensitivity to particulate matter exposure. For example, excessive build-up of particulate matter within the pneumatic actuator 84 can lead to improper operation of the bleed-off valve 70.

Figure 2:
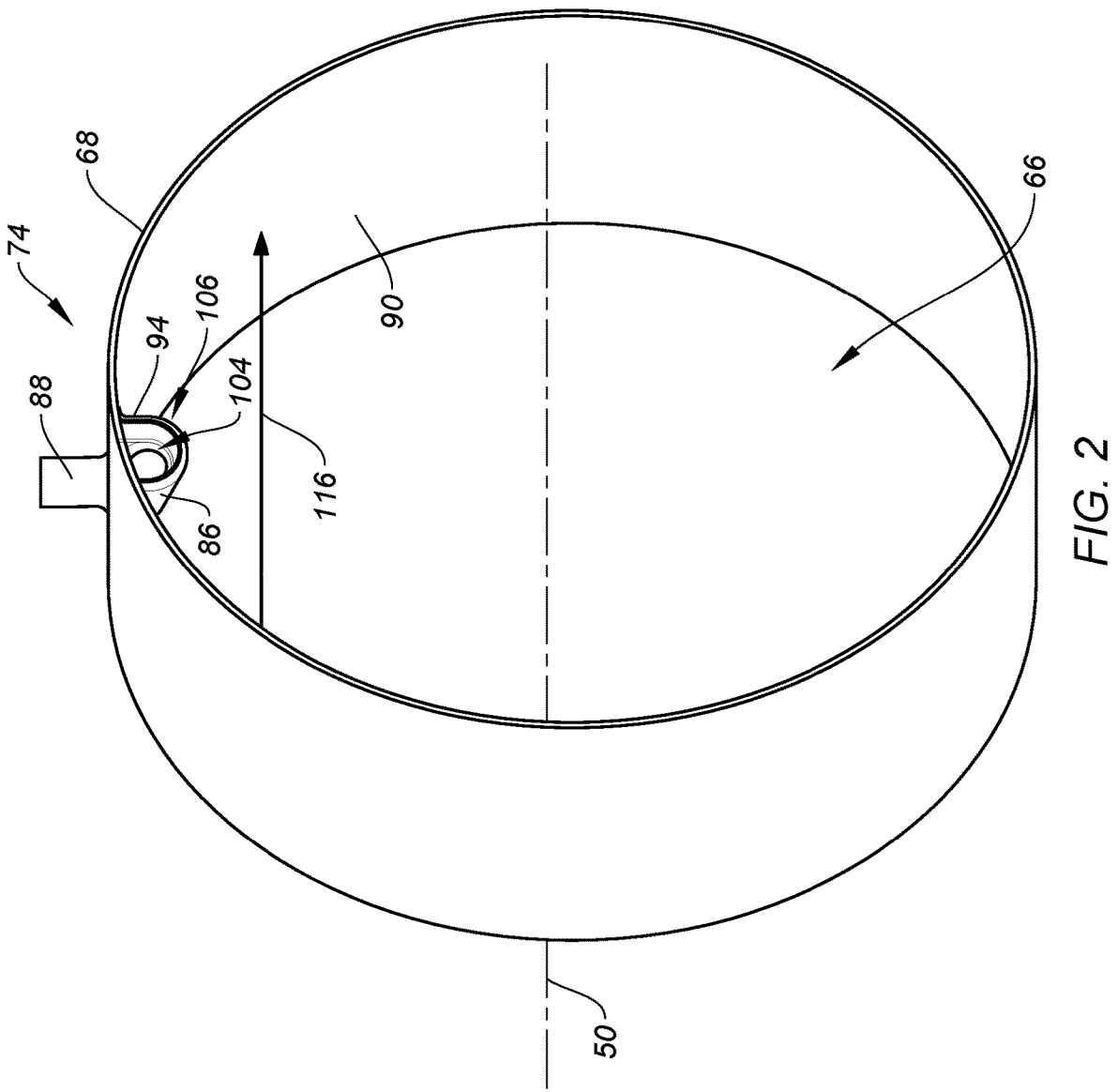
FIG. 2 illustrates a perspective view of a casing and a bleed-off assembly intake device for an aircraft propulsion system, in accordance with one or more embodiments of the present disclosure.
Figure 3:
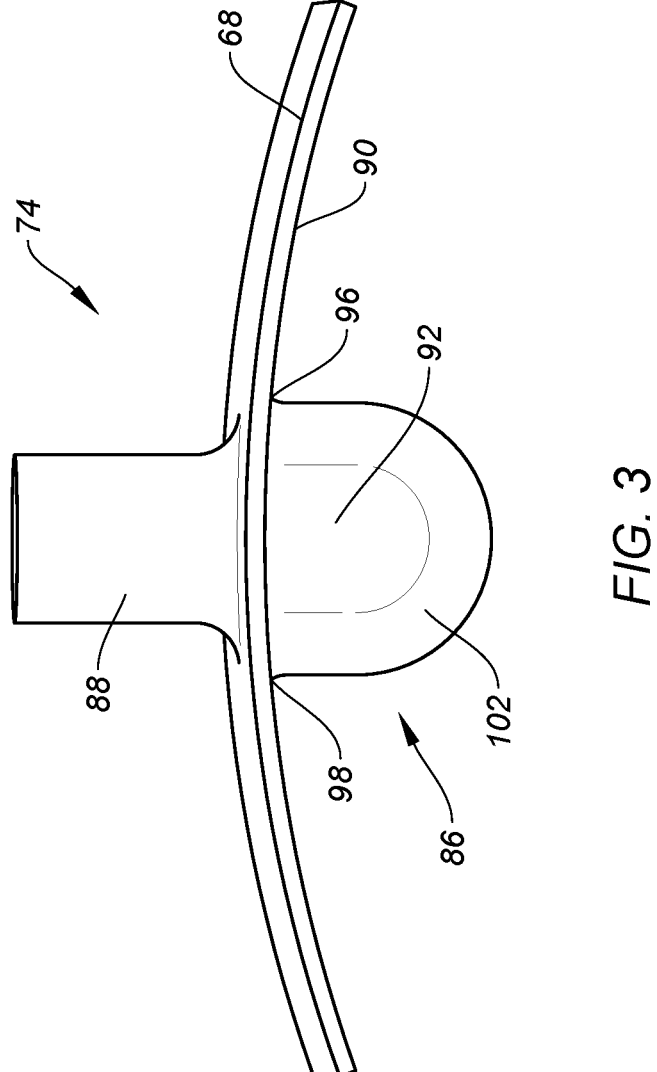
FIG. 3 illustrates an upstream-to-downstream view of the intake device of FIG. 2, in accordance with one or more embodiments of the present disclosure.
Figure 5:
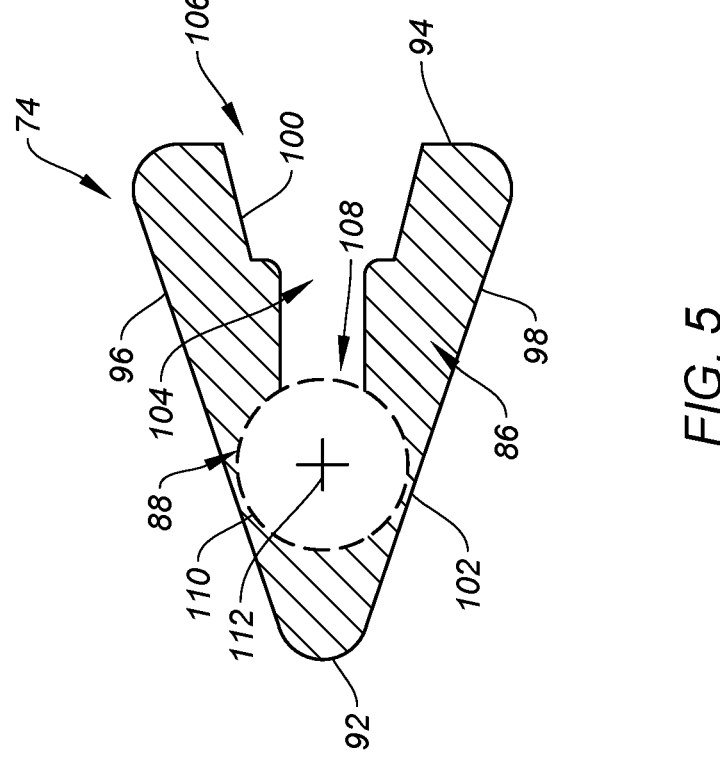
FIG. 5 illustrates a cutaway, bottom view of the intake device of FIG. 2, in accordance with one or more embodiments of the present disclosure.
Figure 4:
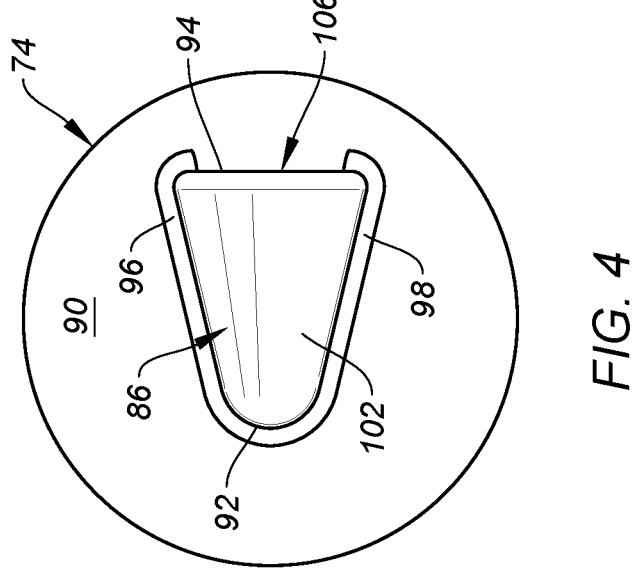
FIG. 4 illustrates a bottom view of the intake device of FIG. 2, in accordance with one or more embodiments of the present disclosure.
Figure 6:
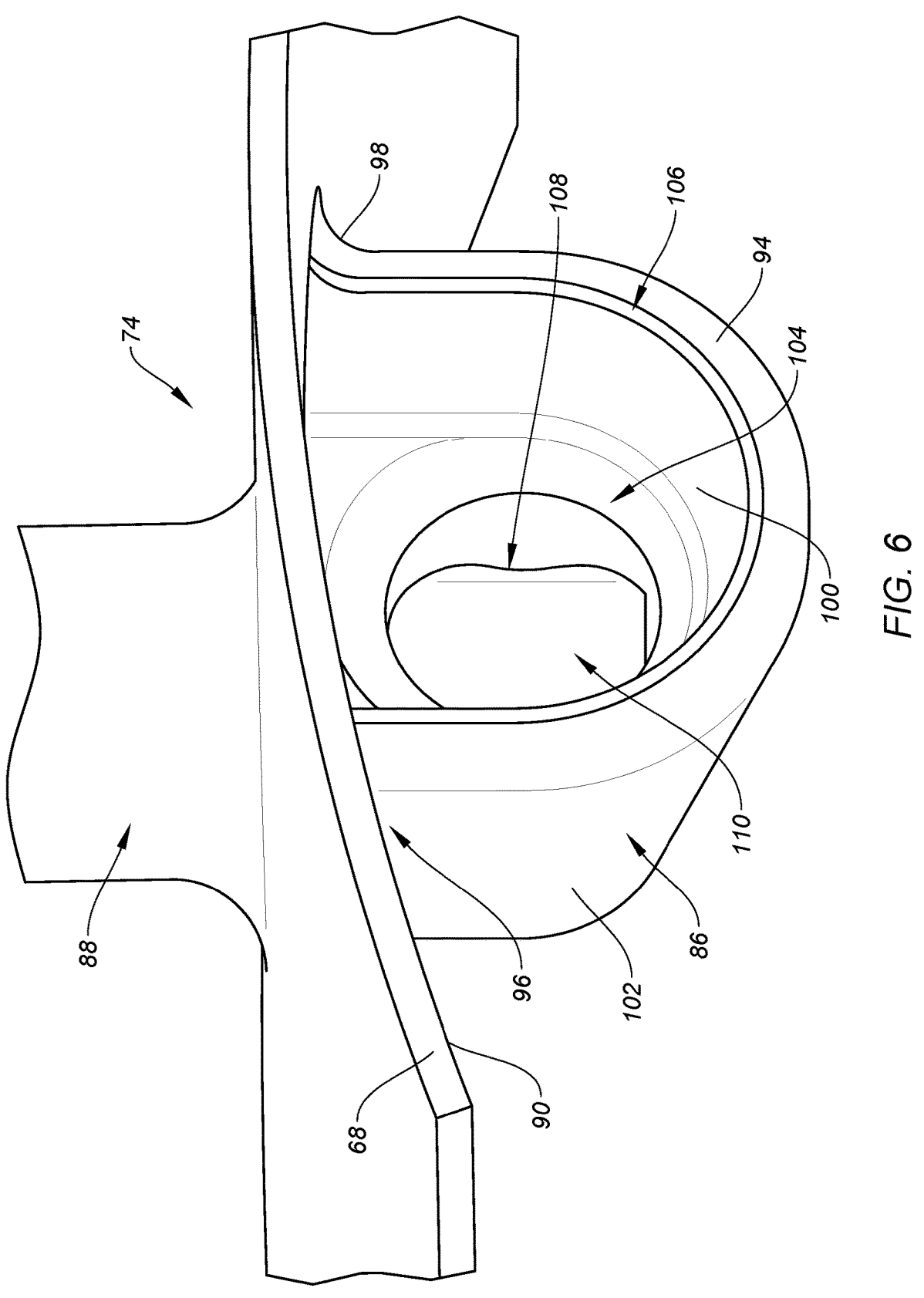
FIG. 6 illustrates a perspective view of the intake device of FIG. 2 showing an inlet cavity of the intake device, in accordance with one or more embodiments of the present disclosure.

FIGS. 2-6 illustrate various views of the intake device 74. The intake device 74 is disposed on the outer casing 68 in fluid communication with the cavity 66. The intake device 74 of FIG. 2 is shown on the outer casing 68 at a top-dead-center position of the outer casing 68. However, the intake device 74 is not limited to any particular circumferential position on the outer casing 68 relative to the rotational axis 50 (see FIG. 1). The intake device 74 includes a particle separator body 86 and an air conduit 88. An air flow direction 116 is provided illustrating a general direction of compressed air flow through the cavity 66. The air flow direction 116 is shown, for example, in FIG. 2 parallel to or substantially parallel to the rotational axis 50, however, as will be discussed in further detail, the present disclosure is not limited to this particular general direction of compressed air flow through the cavity 66.

The particle separator body 86 is mounted to or otherwise disposed at (e.g., on, adjacent, or proximate) an inner radial side 90 of the outer casing 68 and within the cavity 66. The particle separator body 86 extends between and to an upstream end 92 of the particle separator body 86 and a downstream end 94 of the particle separator body 86. As used herein, the terms "upstream" and "downstream" refer to a general direction of compressed air flow through the cavity 66 from the diffuser 36 to the combustor 40 which, for the gas turbine engine 20 of FIG. 1, is an axially forward direction. The particle separator body 86 further extends between and to a first lateral side 96 of the particle separator body 86 and a second lateral side 98 of the particle separator body 86. The particle separator body 86 may be mounted to or otherwise disposed at (e.g., on, adjacent, or proximate) the outer casing 68 (e.g., the inner radial side 90) at the first lateral side 96 and the second lateral side 98 (e.g., the first lateral side 96 and the second lateral side 98 may be disposed at the inner radial side 90).

The particle separator body 86 forms an interior surface 100 and an exterior surface 102. The interior surface 100 forms an inlet cavity 104 of the intake device 74 within the particle separator body 86 and between the interior surface 100 and the inner radial side 90 as shown, for example, in FIG. 5. The particle separator body 86 forms an inlet opening 106 and outlet opening 108 of the inlet cavity 104. The inlet opening 106 is disposed at (e.g., on, adjacent, or proximate) the downstream end 94. The outlet opening 108 is disposed within the particle separator body 86 at (e.g., on, adjacent, or proximate) the air conduit 88. The inlet opening 106 may have a greater cross-sectional area than the outlet opening 108 (e.g., on a plane orthogonal to an air flow direction through the inlet cavity 104 the inlet opening 106 to the outlet opening 108). The exterior surface 102 faces away from the inlet cavity 104. The exterior surface 102 extends between and to the upstream end 92 and the downstream end 94 and between and to the first lateral side 96 and the second lateral side 98.

The particle separator body 86 (e.g., the exterior surface 102) may form an airfoil (e.g., a symmetrical airfoil) having a leading edge at (e.g., on, adjacent, or proximate) the upstream end 92 and extending between and to the upstream end 92 and the downstream end 94. The particle separator body 86 may be rounded at the upstream end 92 and/or a circumferential width of the particle separator body 86 (e.g., relative to the rotational axis 50) may increase in a direction from the upstream end 92 to the downstream end 94. The particle separator body 86 (e.g., the interior surface 100 and the exterior surface 102) may have an arcuate shape extending between and to the first lateral side 96 and the second lateral side 98 to form the inlet cavity 104.

The air conduit 88 (e.g., a pipe, a tube, a hose, or another fluid conduit) extends from the inlet cavity 104 to the pilot valve 72, or an intermediate component (e.g., a particulate filter, an orifice pack, etc.) in fluid communication between the air conduit 88 and the pilot valve 72, outside (e.g., radially outside) the outer casing 68. The air conduit 88 may be mounted to the outer casing 68 (e.g., an outer radial side of the outer casing) and/or formed by portions of the outer casing 68 and the particle separator body 86. The air conduit 88 includes a conduit inlet 110 disposed at (e.g., on, adjacent, or proximate) the inlet cavity 104 (e.g., the outlet opening 108). The conduit inlet 110 may be centered about an inlet axis 112 which is perpendicular to or substantially perpendicular to the rotational axis 50 (see FIG. 1). The conduit inlet 110 may be recessed into the particle separator body 86 to facilitate a reduced likelihood of particulate matter flowing into and being ingested by the air conduit 88. For example, the conduit inlet 110 may be positioned closer to the upstream end 92 than the downstream end 94 within the particle separator body 86.

Referring to FIGS. 7A-C, the particle separator body 86 is positioned on the outer casing 68 (see FIGS. 2-4 and 6) with a centerline 114 of the particle separator body 86 (and its inlet cavity 104) oriented with the air flow direction 116 (e.g., an expected air flow direction) of compressed air flow through the cavity 66 at (e.g., on, adjacent, or proximate) the particle separator body 86. The centerline 114 may extend between and to the upstream end 92 and the downstream end 94. The inlet cavity 104 may extend circumferentially about (e.g., completely around), may be centered on the centerline 114, and/or may extend along the centerline 114 from the inlet opening 106 to the outlet opening 108. This orientation of the particle separator body 86 facilitates separation of particulate matter from air entering the air conduit 88 by directing the compressed air flow along the exterior surface 102, from the upstream end 92 to the downstream end 94 and, therefore, away from the inlet opening 106 such that particulate matter entrained in the compressed air and flowing past the particle separator body 86 is unlikely to enter the inlet opening 106. In some embodiments of the gas turbine engine 20, the compressed air flow may be straightened by the diffuser 36 such that the air flow direction 116 is the same as or substantially the same as an axial direction 118 (e.g., parallel to the rotational axis 50; see FIG. 1) within the cavity 66. Accordingly, as shown in FIG. 7A, in some embodiments, the particle separator body 86 may be positioned on the outer casing 68 with the centerline 114 aligned with (e.g., extending parallel to or substantially parallel to) the axial direction 118. In some other embodiments, the compressed air flow may exhibit some degree of swirl (e.g., a circumferential flow direction component) within the cavity 66. Accordingly, as shown in FIGS. 7B-C, in some embodiments, the particle separator body 86 may be positioned on the on the outer casing 68 with the centerline 114 oriented at a tangent angle $\alpha_T$ relative to the axial direction 118. In other words, the centerline 114 of the particle separator body 86 may be circumferentially offset from the axial direction 118 by the tangent angle $\alpha_T$. As shown in FIGS. 7B-C, the particle separator body 86 may be oriented with the centerline 114 offset in the clockwise or counterclockwise circumferential direction, as necessary for alignment with the air flow direction 116.

Referring to FIGS. 8A-J, the particle separator body 86 may be configured with a variety of different shapes and aerodynamic features to facilitate reduced aerodynamic drag presented by the particle separator body 86 within the cavity 66 (see FIGS. 1-2), improved acceleration of particulate matter along and past the particle separator body 86, and/or obstruction of particulate matter from entering the inlet cavity 104 (e.g., the inlet opening 106). As shown in FIG.

9                                                                                          10

Figures 8A, 8B, 8C, 8D, 8E:
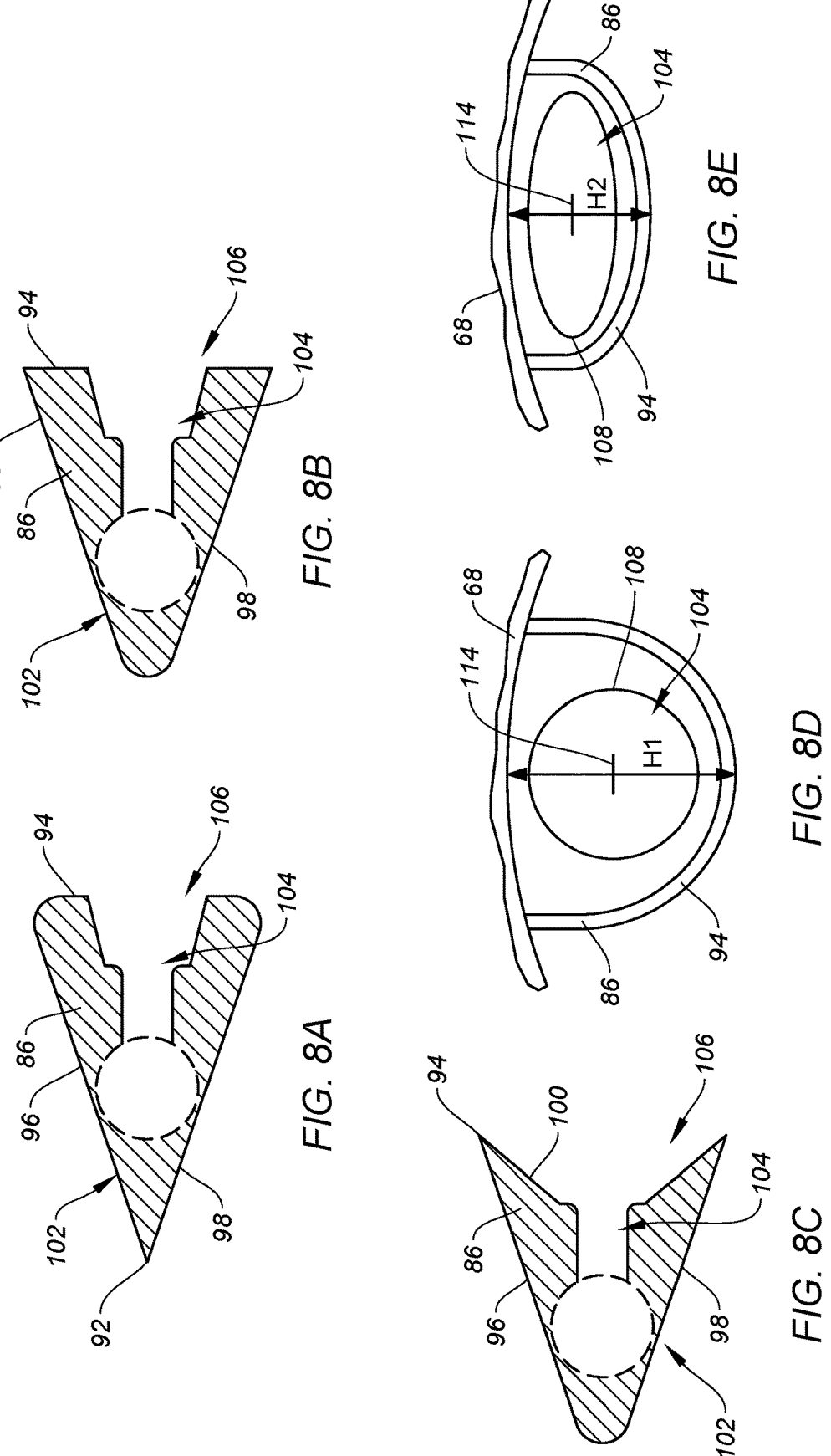

8A, the first lateral side 96 and the second lateral side 98 may be straight or substantially straight along the exterior surface 102 between and to the upstream end 92 and the downstream end 94, and the first lateral side 96 and the second lateral side 98 may intersect at the upstream end 92. As shown in FIG. 8B, the particle separator body 86 may form a flat surface along the downstream end 94, with the flat surface extending between the exterior surface 102 and the inlet opening 106. As shown in FIG. 8C, the interior surface 100 may intersect the exterior surface 102 at the downstream end 94 forming a sharp (e.g., acute) end of the particle separator body 86 at and about the inlet opening 106. As shown in FIG. 8D, a portion of the inlet cavity 104 (e.g., at the outlet opening 108) may have a circular cross-sectional shape extending about and/or centered about the centerline 114.

The particle separator body 86 of FIG. 8D has a first height H1 extending between and to the outer casing 68 (e.g., the inner radial side 90) and a radially innermost position of the particle separator body 86. As shown in FIG. 8E, a portion of the inlet cavity 104 (e.g., at the outlet opening 108) may have an oblong (e.g., oval-shaped) cross-sectional shape extending about and/or centered about the centerline 114. The particle separator body 86 of FIG. 8E has a second height H2 extending between and to the outer casing 68 (e.g., the inner radial side 90) and a radially innermost position of the particle separator body 86, thereby, as a result of the oblong cross-sectional shape of the inlet cavity 104, facilitating a reduction in the profile of the particle separator body 86 within the cavity 66 and a corresponding reduction in the aerodynamic drag present by the particle separator body 86 relative to the air flow within the cavity 66. The present disclosure, however, is not limited to the foregoing exemplary configurations of the particle separator body 86 of FIGS. 8A-E.

As shown in FIGS. 8F-I, the particle separator body 86 may have a convex or a concave curvature of the exterior surface 102 (e.g., along the first lateral side 96 and the second lateral side 98) extending from the upstream end 92 to the downstream end 94. The particle separator body 96 of FIGS. 8F and 8G includes a convex curvature of the exterior surface 102 extending from the upstream end 92 to the downstream end 94. The convex first lateral side 96 intersects the convex second lateral side 98 at the downstream end 94. FIG. 8G illustrates a view of the particle separator body 86 in a downstream-to-upstream direction. As shown in FIG. 8G, the convex first lateral side 96 may intersect the convex second lateral side 98 radially above the inlet opening 106. The particle separator body 96 of FIG. 8H includes a convex curvature of the exterior surface 102 (e.g., along the first lateral side 96 and the second lateral side 98) extending from the upstream end 92 to the downstream end 94, with the particle separator body 86 forming a flat surface along the downstream end 94 extending between the exterior surface 102 and the inlet opening 106. The particle separator body 96 of FIG. 8I includes a concave curvature of the exterior surface 102 (e.g., along the first lateral side 96 and the second lateral side 98) extending from the upstream end 92 to the downstream end 94, with the particle separator body 86 forming a flat surface along the downstream end 94 extending between the exterior surface 102 and the inlet opening 106. The particle separator body 96 includes a flared concave surface portion 120 of the exterior surface 102 at (e.g., on, adjacent, or proximate) the downstream end 94.

The present disclosure intake device 74 and its particle separator body 86 may eliminate or substantially reduce the quantity of particulate matter to which downstream components, such as the bleed-off valve 70 and/or the pneumatic actuator 84, are exposed. The airfoil configuration of the particle separator body 86 may facilitate acceleration of particulate matter along the particle separator body 86 in the air flow direction 116, thereby directing this particulate matter away from the inlet opening 106 at the downstream end 94. While the intake device 74 is describe herein with respect to the operation of the bleed-off valve 70 and pneumatic actuator 84 of FIG. 1, it should be understood that aspects of the intake device 74 may be equally applicable to the operation of other air systems, which other air systems may include components which may be sensitive to particulate matter entrained with the compressed air (e.g., from the compressor 34).

While the principles of the disclosure have been described above in connection with specific apparatuses and methods, it is to be clearly understood that this description is made only by way of example and not as limitation on the scope of the disclosure. Specific details are given in the above description to provide a thorough understanding of the embodiments. However, it is understood that the embodiments may be practiced without these specific details.

It is noted that the embodiments may be described as a process which is depicted as a flowchart, a flow diagram, a block diagram, etc. Although any one of these structures may describe the operations as a sequential process, many of the operations can be performed in parallel or concurrently. In addition, the order of the operations may be rearranged. A process may correspond to a method, a function, a procedure, a subroutine, a subprogram, etc.

The singular forms "a," "an," and "the" refer to one or more than one, unless the context clearly dictates otherwise. For example, the term "comprising a specimen" includes single or plural specimens and is considered equivalent to the phrase "comprising at least one specimen." The term "or" refers to a single element of stated alternative elements or a combination of two or more elements unless the context clearly indicates otherwise. As used herein, "comprises" means "includes." Thus, "comprising A or B," means "including A or B, or A and B," without excluding additional elements.

It is noted that various connections are set forth between elements in the present description and drawings (the contents of which are included in this disclosure by way of reference). It is noted that these connections are general and, unless specified otherwise, may be direct or indirect and that this specification is not intended to be limiting in this respect. Any reference to attached, fixed, connected, or the like may include permanent, removable, temporary, partial, full and/or any other possible attachment option.

The terms "substantially," "about," "approximately," and other similar terms of approximation used throughout this patent application are intended to encompass variations or ranges that are reasonable and customary in the relevant field. These terms should be construed as allowing for variations that do not alter the basic essence or functionality of the invention. Such variations may include, but are not limited to, variations due to manufacturing tolerances, materials used, or inherent characteristics of the elements described in the claims, and should be understood as falling within the scope of the claims unless explicitly stated otherwise.

No element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprise", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

While various inventive aspects, concepts and features of the disclosures may be described and illustrated herein as embodied in combination in the exemplary embodiments, these various aspects, concepts, and features may be used in many alternative embodiments, either individually or in various combinations and sub-combinations thereof. Unless expressly excluded herein all such combinations and sub-combinations are intended to be within the scope of the present application. Still further, while various alternative embodiments as to the various aspects, concepts, and features of the disclosures—such as alternative materials, structures, configurations, methods, devices, and components, and so on—may be described herein, such descriptions are not intended to be a complete or exhaustive list of available alternative embodiments, whether presently known or later developed. Those skilled in the art may readily adopt one or more of the inventive aspects, concepts, or features into additional embodiments and uses within the scope of the present application even if such embodiments are not expressly disclosed herein. For example, in the exemplary embodiments described above within the Detailed Description portion of the present specification, elements may be described as individual units and shown as independent of one another to facilitate the description. In alternative embodiments, such elements may be configured as combined elements.

The invention claimed is:

1. An aircraft propulsion system comprising:
a casing extending circumferentially about an axis of the aircraft propulsion system, the casing including an inner radial side, the inner radial side forming and circumscribing an annular cavity;
a compressor is disposed about the axis, the compressor is configured to direct a compressed air flow into and through the annular cavity in an air flow direction; and
an assembly including an intake device disposed on the casing, the intake device including a particle separator body and an air conduit,
the particle separator body is disposed at the inner radial side, the particle separator body extending from an upstream end to a downstream end in the air flow direction, the particle separator body extending between and to a first lateral side and a second lateral side, the first lateral side and the second lateral side are disposed at the inner radial side, the particle separator body forming an interior surface and an exterior surface, the interior surface forming an inlet cavity of the intake device, the inlet cavity having an inlet opening at the downstream end, the exterior surface forming an airfoil of the particle separator body, and the airfoil having a leading edge at the upstream end, the airfoil increasing in circumferential width, relative to the axis, from the upstream end to the downstream end along the casing, and
the air conduit extending through the casing, the air conduit including a conduit inlet within the particle separator body, and the conduit inlet is disposed at the inlet cavity, wherein the particle separator body has an arcuate shape between the first lateral side and the second lateral side, the arcuate shape of the particle separator body forms the inlet cavity between the particle separator body and the inner radial side, and the first lateral side and the second lateral side each being circumferential ends of the particle separator body.

2. The aircraft propulsion system of claim 1, wherein the particle separator body has a centerline extending between and to the upstream end and the downstream end, and the centerline is oriented substantially parallel to the axis.

3. The aircraft propulsion system of claim 1, wherein the particle separator body has a centerline extending between and to the upstream end and the downstream end, and the centerline is oriented at a tangent angle relative to an axial direction of the axis.

4. The aircraft propulsion system of claim 1, wherein the conduit inlet is disposed within the particle separator body closer to the upstream end than the downstream end.

5. The aircraft propulsion system of claim 1, wherein the conduit inlet extends about an inlet axis, and the inlet axis is perpendicular to the axis.

6. The aircraft propulsion system of claim 1, wherein the inlet cavity extends between and to the inlet opening and an outlet opening at the conduit inlet, and the inlet opening has a greater cross-sectional area than the outlet opening.

7. The aircraft propulsion system of claim 1, wherein the inlet cavity has an oblong cross-sectional shape.

8. The aircraft propulsion system of claim 1, wherein the assembly further includes a bleed-off valve and a pneumatic actuator, the pneumatic actuator is operably connected to the bleed-off valve to position the bleed-off valve in an open position, a closed position, or an intermediate position between the open position and the closed position, and the pneumatic actuator is connected in fluid communication with the air conduit to receive a portion of the compressed air flow from the inlet cavity for positioning the bleed-off valve.

9. The aircraft propulsion system of claim 8, wherein the assembly further includes a pilot valve connected in fluid communication with and between the air conduit and the pneumatic actuator.

10. The aircraft propulsion system of claim 8, wherein the bleed-off valve includes a bleed inlet and a bleed outlet, the bleed inlet is connected in fluid communication with the compressor by a pressure relief line, and the bleed-off valve is positionable in the open position, the closed position, or the intermediate position to direct a bleed air flow from the compressor to the bleed outlet.

11. The aircraft propulsion system of claim 1, further comprising a diffuser connected in fluid communication with and between the compressor and the annular cavity, and the diffuser is configured to direct the compressed air flow from the compressor to the annular cavity.

12. The aircraft propulsion system of claim 1, further comprising a combustor forming a combustion chamber, the annular cavity being disposed at the combustor,
wherein the particle separator body is disposed at the inner radial side on an outer radial end of the annular cavity and partially radially extends into the annular cavity from the outer radial end of the annular cavity toward the combustor.

13. The aircraft propulsion system of claim 1, wherein the compressed air flow into and through the annular cavity in the air flow direction is a compressed air flow gas path, the particle separator body being disposed along the compressed air flow gas path.

14. The aircraft propulsion system of claim 1, wherein the compressed air flow into and through the annular cavity in the air flow direction is a compressed air flow gas path, and wherein the casing is a gas generator casing and the particle separator body is disposed on an inner radial side of the gas generator casing along the air flow gas path.

15. A bleed-off assembly for an aircraft propulsion system, the bleed-off assembly comprising:

a casing extending circumferentially about an axis, the casing including an inner radial side, and the inner radial side forming and circumscribing an annular cavity;

a bleed-off valve and a pneumatic actuator are disposed radially outside of the casing, the pneumatic actuator is operably connected to the bleed-off valve to position the bleed-off valve in an open position, a closed position, or an intermediate position between the open position and the closed position; and an intake device is disposed on the casing, the intake device including a particle separator body and an air conduit, the particle separator body is disposed at the inner radial side, the particle separator body extending from an upstream end to a downstream end, the particle separator body extending between and to a first lateral side and a second lateral side, the particle separator body forming an interior surface and an exterior surface, the interior surface forming an inlet cavity of the intake device, the inlet cavity having an inlet opening at the downstream end, the exterior surface forming an airfoil of the particle separator body having a leading edge at the upstream end, the airfoil increasing in circumferential width, relative to the axis, from the upstream end to the downstream end along the casing, and the air conduit extending through the casing, the air conduit including a conduit inlet within the particle separator body, the conduit inlet is disposed at the inlet cavity, the air conduit connecting the inlet cavity in fluid communication with the pneumatic actuator.

16. The bleed-off assembly of claim 15, wherein the particle separator body has a centerline extending between and to the upstream end and the downstream end, and the centerline is oriented substantially parallel to the axis.

17. The bleed-off assembly of claim 15, wherein the particle separator body has a centerline extending between and to the upstream end and the downstream end, and the centerline is oriented at a tangent angle relative to an axial direction of the axis.

18. An aircraft propulsion system comprising:

a casing extending circumferentially about an axis of the aircraft propulsion system, the casing including an inner radial side, the inner radial side forming and circumscribing an annular cavity;

a compressor is disposed about the axis, the compressor is configured to direct a compressed air flow into and through the annular cavity in an air flow direction; and an assembly including a bleed-off valve, a pneumatic actuator, and an intake device, the pneumatic actuator is operably connected to the bleed-off valve to position the bleed-off valve in an open position, a closed position, or an intermediate position between the open position and the closed position, the bleed-off valve including a bleed inlet and a bleed outlet, the bleed inlet is connected in fluid communication with the compressor by a pressure relief line, and the bleed-off valve is positionable in the open position, the closed position, or the intermediate position to direct a bleed air flow from the compressor to the outlet, and the intake device including a particle separator body and an air conduit, the particle separator body is disposed at the inner radial side, the particle separator body extending from an upstream end to a downstream end in the air flow direction, the particle separator body forming an inlet cavity and an exterior surface, the inlet cavity having an inlet opening at the downstream end, the exterior surface forming an airfoil of the particle separator body having a leading edge at the upstream end, the airfoil increasing in circumferential width, relative to the axis, from the upstream end to the downstream end along the casing, and the air conduit extending through the casing, the air conduit including a conduit inlet within the particle separator body, the conduit inlet is disposed at the inlet cavity, and the air conduit is connected in fluid communication with the pneumatic actuator to direct a portion of the compressed air flow from the inlet cavity to the pneumatic actuator for positioning the bleed-off valve, wherein the particle separator body has an arcuate shape between the first lateral side and the second lateral side, the arcuate shape of the particle separator body forms the inlet cavity between the particle separator body and the inner radial side, and the first lateral side and the second lateral side each being circumferential ends of the particle separator body.

19. The aircraft propulsion system of claim 18, wherein the particle separator body has a centerline extending between and to the upstream end and the downstream end, and the centerline is oriented substantially parallel to the air flow direction.

20. The aircraft propulsion system of claim 18, wherein the particle separator body has a centerline extending between and to the upstream end and the downstream end, the centerline is oriented at a tangent angle relative to an axial direction of the axis, and the centerline is oriented substantially parallel to the air flow direction.

\* \* \* \* \*